US010922292B2

(12) United States Patent
Dawson (10) Patent No.: US 10,922,292 B2
(45) Date of Patent: Feb. 16, 2021

(54) METAMORPHIC STORAGE OF PASSCODES (71) Applicant: WebCloak, LLC, Irvine, CA (US)

(72) Inventor: Martin Dawson, Laguna Beach, CA (US)

(73) Assignee: Webcloak, LLC, Irvine, CA (US)

(*) Notice: Subject to any disclaimer, the term of this patent is extended or adjusted under 35 U.S.C. 154(b) by 399 days.

(21) Appl. No.: 15/070,849

(22) Filed: Mar. 15, 2016

(65) Prior Publication Data
US 2016/0283744 A1 Sep. 29, 2016

Related U.S. Application Data (60) Provisional application No. 62/138,208, filed on Mar. 25, 2015.

(51) Int. Cl.
G06F 16/22 (2019.01)
G06F 21/45 (2013.01)
G06F 21/62 (2013.01)

(52) U.S. Cl.
CPC ............ G06F 16/22 (2019.01); G06F 21/45 (2013.01); G06F 21/6245 (2013.01)

(58) Field of Classification Search
CPC ............... G06F 17/30312; G06F 21/45; G06F 21/6245; G06F 21/30
See application file for complete search history.

(56) References Cited

U.S. PATENT DOCUMENTS 5,724,426 A 3/1998 Rosenow et al.
7,895,406 B2 2/2011 Nagao
7,992,005 B2 8/2011 Torres
8,306,216 B2 11/2012 Michiels et al.
8,335,930 B2 12/2012 Johnson et al.
8,413,906 B2 4/2013 Abd Alla et al.
9,619,656 B1* 4/2017 Easttom, II ............. G06F 21/60
2006/0177065 A1* 8/2006 Halbert ................. H04L 9/0662
380/277
2008/0115217 A1 5/2008 Barron et al.
2008/0219449 A1 9/2008 Ball et al.
(Continued)

FOREIGN PATENT DOCUMENTS

WO 2002005481 1/2002

Primary Examiner — Ashish Thomas
Assistant Examiner — Jedidiah P Ferrer
(74) Attorney, Agent, or Firm — Fish IP Law, LLP (57) ABSTRACT Systems and methods for securing sensitive data are presented. The system includes a database that stores multiple data storage schemes, each of which denotes at least one location for storing at least a portion of the sensitive data within a data block object. The system further includes a security controller module comprising a processor and software instructions. When executed by the processor, the processor (a) instantiates a data block object for storing the sensitive data and (b) selects a data storage scheme. Then the processor stores the sensitive data within the data block object according to the data storage scheme. The processor also can provide access to the data block object. After allowing an access, the processor automatically selects another data storage scheme, and morphs the data block object by storing the sensitive data within the data block object according to the newly selected data storage scheme.

19 Claims, 4 Drawing Sheets (56) References Cited

U.S. PATENT DOCUMENTS

| | | | |
|---|---|---|---|
| 2009/0022319 A1* | 1/2009 | Shahaf | H04L 9/0656 380/278 |
| 2009/0158051 A1 | 6/2009 | Michiels et al. | |
| 2009/0249080 A1 | 10/2009 | Zhang et al. | |
| 2010/0240449 A1 | 9/2010 | Corem et al. | |
| 2011/0145638 A1* | 6/2011 | Syrgabekov | G06F 11/1088 714/20 |
| 2011/0292934 A1* | 12/2011 | Oishi | H04H 40/27 370/389 |
| 2013/0062420 A1* | 3/2013 | Hamman | G06Q 20/3823 380/28 |
| 2014/0056333 A1 | 2/2014 | Neff | |
| 2014/0355754 A1* | 12/2014 | Leung | H04L 9/065 380/28 |
| 2014/0376306 A1 | 12/2014 | Bedeschi et al. | |
| 2015/0339314 A1* | 11/2015 | Collins | G06F 16/1744 707/627 |

* cited by examiner

METAMORPHIC STORAGE OF PASSCODES

This application claims the benefit of priority to U.S. provisional patent application 62/138,208 filed Mar. 25, 2015, which is incorporated by reference herein in its entirety.

FIELD OF THE INVENTION

The field of the invention is systems and methods for implementing secured storage of sensitive data.

BACKGROUND

The following description includes information that may be useful in understanding the present invention. It is not an admission that any of the information provided herein is prior art or relevant to the presently claimed invention, or that any publication specifically or implicitly referenced is prior art.

Many online and offline applications that provide access to personal and confidential information (e.g., financial information, health information, private information, etc.) restrict user access based on user passcodes. In many such applications, the user passcodes are stored in a database, which can be vulnerable to unauthorized access (e.g., attack by hackers, etc.), especially if the passcodes are stored in a table as plain text.

Many technologies have been developed to provide safer storage of passcodes in the database using encryption and decryption methods. For example, international patent application No. WO 02/05481 to Lee provides a three way encryption/decryption process to store a passcode. In this system, the passcode is encrypted, and the encrypted text of the passcode is manipulated to further code the secret message text by rearranging bits in a byte. In another example, U.S. Pat. No. 5,724,426 to Rosenow discloses a password storage system using an access controller. In this system, when an access to the passcode data base is attempted, access controllers exchange sets of internally generated DES encrypted access authorization codes utilizing protocols characterized by multiple random numbers and keys. The keys are renewed by multiple random numbers and multiple hidden algorithms for each access.

Some have sought to solve the problem by partitioning memory areas for storage of passcodes. For example, U.S. Pat. No. 7,895,406 to Nagao provides storage of passwords by partial bit strings in memory areas that are physically located apart from each other. Additionally, the partial memory areas where the password is to be programmed can be changed to prevent fraudulent acquisition of password. For another example, U.S. Pat. No. 8,413,906 to Abd Alla discloses methods of hiding sensitive information in smart cards by randomizing the hidden memory location within the smart card where the password is stored. In that system, the memory location is changed every time the smart card is used.

Others have sought to solve the problem by using pattern-based password tools. For example, U.S. Pat. No. 7,992,005 to Tones provides a system to convert a password into a spatial position of elements on a matrix by randomly generated characters. The matrix is repopulated with randomly generated characters every time the user accesses the account.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for improved system and methods for secure storage of passcodes in the database.

SUMMARY OF THE INVENTION

The inventive subject matter provides systems and methods of securing sensitive data in a data object using a scramble table and data storage schemes, and by morphing the data object after the data object is accessed.

One aspect of the inventive subject matter relates a system for securing sensitive data. The system includes a database that stores a scramble table and a security controller module. The scramble table includes a plurality of data storage schemes, each of which denotes at least one location for storing at least a portion of the sensitive data within a data block object. In a preferred embodiment, the scramble table includes a plurality of random ascending numbers.

The security controller module includes a processor and software instructions. When executed by the processor, the instructions cause the processor to instantiate a data block object for storing the sensitive data. The instructions further cause the processor to select a first data storage scheme from the plurality of data storage schemes and then store the sensitive data within the data block object according to the first data storage scheme. In some embodiments, the instructions further cause the processor to provide a user access to the sensitive data. In these embodiments, after providing access to the sensitive data, the instructions further cause the processor to select a second data storage scheme from the plurality of data storage schemes. Then, the instructions further cause the processor to morph the data block object by storing the sensitive data within the data block object according to the second data storage scheme.

Another aspect of the inventive subject matter relates to a computer-implemented method of securing sensitive data. The method begins with a step of providing access to a first data storage scheme and a second data storage scheme. In a preferred embodiment, each of the first and second data storage schemes denotes at least one location for storing at least a portion of the sensitive data within a data block object. Then, a processor can instantiate a data block object for storing the sensitive data. Once the data block object is initiated, the processor can select a first data storage scheme from the plurality of data storage schemes and store the sensitive data within the data block object according to the first data storage scheme.

In some embodiments, the processor provides access to the data block object. Once the access is provided, the processor can automatically select a second data storage scheme from the plurality of data storage schemes. Then, the processor can morph the data block object by storing the sensitive data within the data block object according to the second data storage scheme.

Various objects, features, aspects and advantages of the inventive subject matter will become more apparent from the following detailed description of preferred embodiments, along with the accompanying drawing figures in which like numerals represent like components.

DETAILED DESCRIPTION

Throughout the following discussion, numerous references will be made regarding servers, services, interfaces, engines, modules, machines, clients, peers, portals, platforms, or other systems formed from computing devices. It should be appreciated that the use of such terms is deemed to represent one or more computing devices having at least one processor (e.g., ASIC, FPGA, DSP, x86, ARM, ColdFire, GPU, multi-core processors, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, a circuit-switched network, the Internet, LAN, WAN, VPN, or other type of network.

The terms "configured to" and "programmed to" in the context of a processor refer to being programmed by a set of software instructions to perform a function or set of functions.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Further, the terms "coupled to" and "coupled with" are used euphemistically in a networking context to mean "communicatively coupled with" where two or more devices are configured to exchange data (e.g., uni-directionally, bi-directionally, peer-to-peer, etc.) with each other possibly via one or more intermediary devices.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

In some embodiments, the numbers expressing quantities of properties such as dimensions used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

One aspect of the present inventive subject matter provides systems that enable a user to securely store sensitive data (e.g., passwords, passcodes, secret texts, etc.) in a data object and protect the sensitive data from an unauthorized access or repeated accesses. The sensitive data is stored in the data object according to a data storage scheme, and the data storage scheme is changed once the sensitive data is accessed. As the data storage scheme is changed, the location of sensitive data stored in the data object is morphed.

An advantage of the methods and systems disclosed herein is to allow sensitive data that is frequency accessed by users (e.g., passwords, etc.) to be securely stored in an electronic storage. Once the sensitive data is stored in the data object using the method disclosed herein, it provides additional obstacles for malicious intruders to extract the sensitive data, even if the malicious intruders are able to access the data object that stores the sensitive data.

One example of these systems is Metamorphic Password Block Process (MPBP) system. MPBP system allows for the safe storage of sensitive data (e.g., plain text passwords or challenge phrases) in a memory or on other storage media, by concealing it in a larger data block (e.g., 4K characters, etc.) (referred to as "pblock" hereinafter) using a hidden pointer to a key mask to denote its location amongst random data nibbles. When implementing a secure system it can be necessary to store a password or challenge phrase in plain text (un-encrypted). Plain text passwords are vulnerable to detection by malicious processes or through various exploits. Every time the pblock is accessed, the pblock is recreated or morphed in a new memory location along with a new key mask. This removes predictability from the storage and recovery systems.

Figure 1:
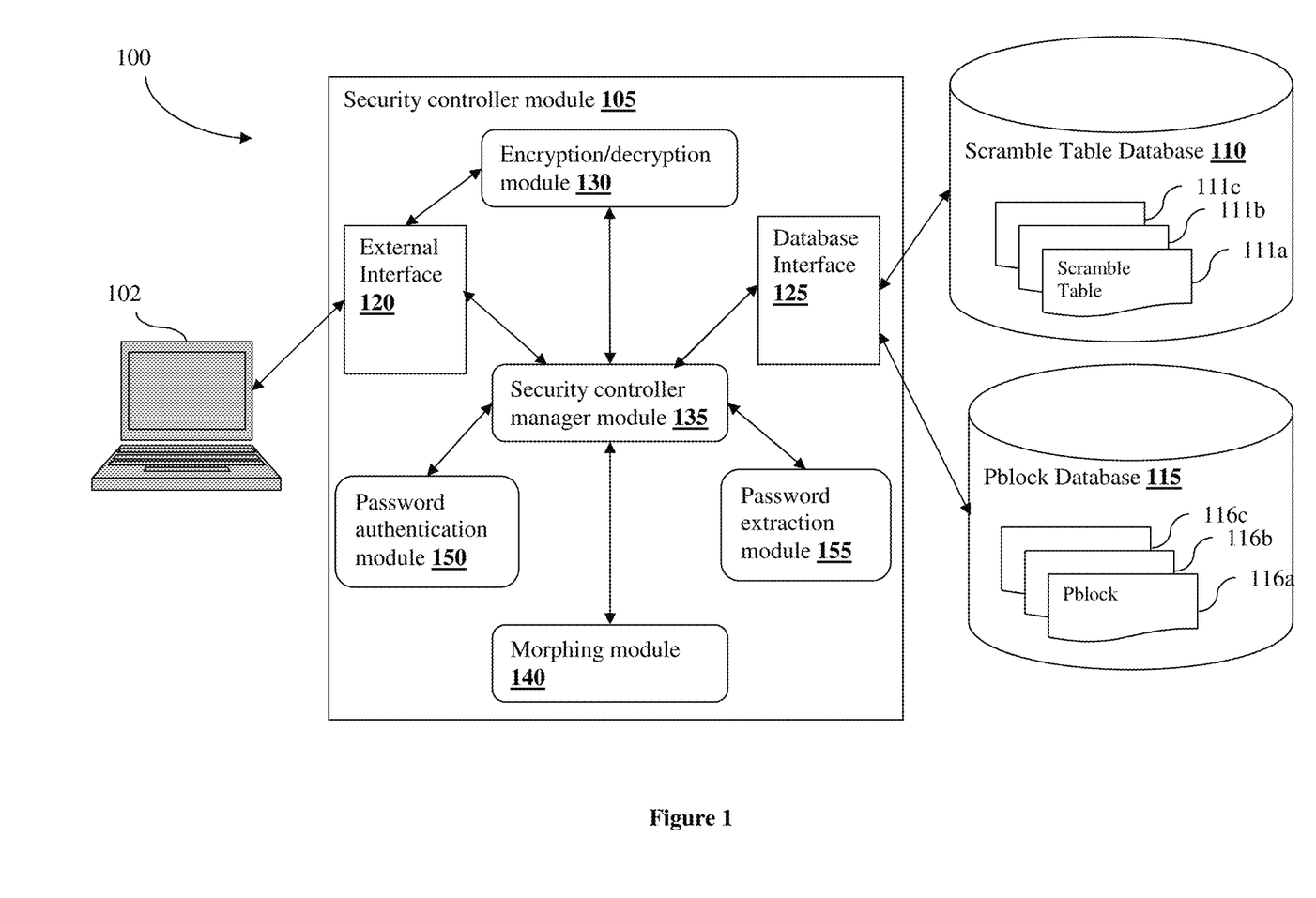
FIG. 1 shows one embodiment of a system to secure sensitive data in a data object by using a scramble table and data storage schemes.

FIG. 1 illustrates one embodiment of an MPBP system 100 for securing sensitive data. The system 100 includes a scramble table database 110, a password block ("pblock") database 115, and a security controller module 105. The scramble table database 110 includes a plurality of scramble tables 111a, 111b, 111c. The pblock database 115 includes a plurality of pblocks 116a, 116b, 116c. In a preferred embodiment, a scramble table includes ascending, non repeating integers with the least significant bit used to point to a high or low order nibble of a pblock data element. The number of integers included in the scramble table is determined by the maximum size of the sensitive data that will be added to the pblock.

In some embodiments, a pblock is a data structure (e.g., a data object) large enough to store the sensitive data and a lot of other randomly generated data. Preferably, a pblock has a size that is at least twice the maximum size of the sensitive data, more preferably four times the maximum size of the sensitive data, and even more preferably more than six times the maximum size of the sensitive data. Each pblock can be divided into many characters, and each character can be further divided into two equal nibbles. For example, if a pblock character has a size of 32 bits, a nibble is would have a size of 16 bits. In another example, if a pblock character is 8-bit in size (byte-size character), then each nibble has a size of 4 bits, that can be represented by a heximal character. As such, the highest integer that is stored in the scramble table is the maximum number of stored characters multiplied by the number of nibbles per character. It is preferable that a pblock has at least 4K characters to adequately obfuscate that stored sensitive data.

Each integer within the scramble table indicates a character address within the pblock, and a nibble (e.g., a high order nibble or a low order nibble) within the character address.

The security controller module 105 is communicatively coupled with a computing device 102 (e.g., a computer, a laptop, a kiosk, a mobile device, etc.) via an external interface 120 of the security controller module 105. The external interface 120 is configured to receive any information and/or inputs from a user (e.g., a person, an automated system, etc.) related to sensitive data and relay the information and/or inputs to other modules in the security controller module 105. In some embodiments, the security controller module 105 is a part of the computing device 102. In other embodiments, it is contemplated that the security controller module 105 is coupled with the security controller module 105 via a network (e.g., the Internet, a LAN, etc.).

The security controller module 105 is also communicatively coupled with the scramble table database 110 and the pblock database 115 via a database interface 125. The database interface 125 is configured to exchange information and/or data (e.g., at least one scramble table 111a, 111b, 111c) from the scramble table database 110 and relay the information and/or inputs to other modules in the security controller module 105. Also the database interface 125 is configured to exchange information and/or data between various modules in the security controller module 105 and pblock database 115. In some embodiments, the security controller module 105 is a part of the computing device 102. In some embodiments, the security controller module 105 is located in a same device with at least one of the scramble table database 110 and the pblock database 115. In other embodiments, it is contemplated that the security controller module 105 is coupled with at least one of the scramble table database 110 and the pblock database 115 via a network (e.g., the Internet, a LAN, etc.).

The security controller module 105 includes a security controller manager module 135. In some embodiments, the security controller manager module 135 is configured to receive instructions from the computing device 102 related to the sensitive data. For example, the instructions can include storing a new piece of sensitive data, requesting access to a service based on a password input string, retrieving the sensitive data, and others.

In some embodiments, upon receiving an instruction to store a new piece of sensitive data, the security controller module 105 is programmed to instantiate a new data object (e.g., a new pblock). In some embodiments, the security controller module 105 is programmed to select a scramble table among the many scramble tables stored in the scramble table database 110 for encoding the sensitive data within the newly instantiated data object.

To encode the sensitive data within the data object according to the selected scramble table, the security controller module 105 of some embodiments is programmed to divide the sensitive data into many chunks (e.g., four-bit chunks), and place the different chunks within the data object at the character addresses indicated by the selected scramble table, respectively. In some embodiments, the security controller module 105 is programmed to also fill the remaining unoccupied spaces within the data object with randomly generated data (e.g., randomly generated bits).

In a preferred embodiment, the security controller manager module 135 is programmed to create scramble tables (e.g., 111a, 111b, 111c, etc.) in advance and store the scramble tables 111a, 111b, 111c in the scramble table database 110. In this embodiment, the security controller manager module 135 is programmed to create a scramble table by randomly generating a set of distinct integers. The set of distinct integers can be from 0 to the maximum possible integer. As mentioned above, the maximum possible integer in the scramble table depends on the size of the pblock that the scramble table is designed for. That is, the maximum possible integer in the scramble table should equal the number of characters in the pblock multiplied by the number of nibbles. For example, if there are 100 characters in the pblock, and each character has 2 nibbles, the maximum possible integer in the scramble table is 200.

Preferably, the security controller module 105 is programmed to order the set of randomly generated integers in an ascending order.

In some embodiments, the security controller module 105 is programmed to create more than one scramble tables (preferably a sufficiently large number of scramble tables for rotation) well in advance. In other embodiments, the security controller module 105 is programmed to create a new scramble table only when a new scramble table is needed. To encode the sensitive data, the security controller manager module 135 is programmed to either select one scramble table from the multiple scramble tables created and stored in the scramble table database 110 or create a brand new scramble table for the new data object.

While the size of a scramble table 111a, 111b, and 111c can vary, it is preferred that the number of randomly generated integers in the scramble table is at least equal to the size of the sensitive data divided by the size of a nibble. The number of randomly generated integers in a scramble table can be at least twice the maximum size of the sensitive data to be stored plus the size of a delimiter. As used herein, a delimiter is a sequence of one or more characters used to specify the boundary between separate, independent regions in plain text or other data streams. The random scramble table entry is generated between zero (or any previously generated number at initialization) and the size of the pblock divided by the number of sensitive data characters left to decode. For example, if the size of the pblock is 48 and the number of sensitive data characters is 2, then the size (e.g., number of entries in the scramble table) can be between 2 and 4, and the random scramble table entry can be ascending numbers between 0 and 24. However, it is contemplated that any suitable number of random scramble table entries and the size of random table, that can be an adequate number of positions available in the pblock and that can provide a balanced distribution of locations in the pblock, can be used.

Each scramble table has a data storage scheme. For example, each random number in a scramble table 111a, 111b, 111c, denotes a location (e.g., character address, etc.) in the pblock 116a, 116b, 116c for storing at least a portion of the sensitive data. Each character location in the pblock has two slots (nibbles) to store a piece of data (e.g., a 4-bit data), which is referred as high order or low order nibble of the character location. In a preferred embodiment, each number in a scramble table 111a, 111b, 111c, also denotes whether the sensitive is stored in the high order or low order nibble of the character location. In other embodiments, the security controller manager module 135 is configured to generate a random bit 0 or 1 to denote the high or low order nibble that indicates the location of the sensitive data to be stored in the pblock. The other nibble is populated with random bit data.

As used herein, the term "random numbers" includes pseudo-random numbers.

In those embodiments that the security controller module 105 generates multiple scramble tables in advance, each scramble table is identifiable by a unique identifier assigned by the security controller module 105. Additionally, the security controller module 105 is programmed to insert the unique identifier associated with the selected scramble table at a location (e.g., the first byte, the last byte, etc.) in the pblock.

Once the pblock 116a, 116b, 116c is created and a scramble tablella, 111b, 111c is selected that denotes the location in the pblock 116a, 116b, 116c where the sensitive data can be stored, the security controller manager module 135 is programmed to store the sensitive data within the selected pblock 116a according to the data storage scheme. In a preferred embodiment, the security controller manager module 135 is programmed to divide the sensitive data into multiple portions (chunks) and store the multiple portions in the pblock at the locations indicated by the integers stored in the scramble table. In some embodiments, the size of each portion equals to the size of a nibble in the pblock. For example, when each character has a size of one byte, and each nibble has a size of four bits (half a byte), the security controller module 105 is programmed to divide the sensitive data into multiple four-bit sized portions. The portions are distinct and adjacent with each other.

In some embodiments, security controller module 105 further includes an optional encryption/decryption module 130 that is communicatively coupled with the external interface 120 and the security controller manager module 135. The encryption/decryption module 130 is programmed to encrypt the information related to the sensitive data provided by the user on the computing device 102 before storing the sensitive data in the pblock 116a or decrypt an encrypted sensitive data extracted and relayed from the security controller manager module 135 before sending out to the computing device 102. It is contemplated that any encryption-decryption methods available in the art can be used including hashing, symmetric methods (e.g., private-key cryptography), and asymmetric methods (public-key cryptography).

In some embodiments, the security controller module 105 further includes a password authentication module 150 that is communicatively coupled with security controller manager module 135. The password authentication module 150 is programmed to validate the information related to the sensitive data (e.g., inputted string) entered by the user (e.g., via the computing device 102) against the pblock and/or the scramble table identifier. When the user enters the information related to the sensitive data, the information is received via the external interface 120 and relayed to the security controller manager module 135. In a preferred embodiment, the security controller manager module 135 is programmed to divide the information into a plurality of portions, in the same manner that the security controller manager module 135 divides the sensitive data into multiple portions for storing in the pblock.

Each pblock stores sensitive data that is associated with a user for a target service. Preferably, when the security controller module 105 stores the sensitive data, it also stores the associated information as metadata of the sensitive data (e.g., owner of the sensitive data, target service information, etc.). In some embodiments, the security controller module 105 is programmed to store the metadata in a separate database (not shown) that provides fast searching and retrieval service. The security controller module 105 is also programmed to store a link between the metadata associated with the sensitive data and the pblock that stores the sensitive data. As such, when a user submits an input string for authentication to be used for a target service, the security controller manager module 135 is programmed to first identify the metadata that matches the information of the user and the target service. Then, the security controller manager module 135 is programmed to retrieve the pblock (e.g., pblock 116a) that is linked by the identified metadata. Additionally, the security controller module 105 is also programmed to retrieve the scramble table (e.g., scramble table 111a) that is used to store the sensitive data in the pblock 116a. Then, the security controller manager module 135 is programmed to send the pblock 116a, the scramble table 111a, and the multiple portions of the input string to the password authentication module 150.

The password authentication module 150 is programmed to read the pblock 116a byte by byte sequentially, and compare the data at the pblock with the multiple portions of the input string, using information derived from the scramble table 111a. As the password authentication module 150 is reading the pblock 116a, it is also programmed to decipher the location addresses from the integers stored in the scramble table 111a.

As mentioned above, each integer in the scramble table denotes a character location and a nibble order in a pblock. In the preferred embodiments, the integers are stored in ascending order in the scramble table 111a. Thus, the password authentication module 150 is programmed to sequentially read the integers, starting from the first integer, from the scramble table 111a and decipher a character location and nibble order from each integer. As mentioned above, each of the locations derived from the integers in the pblock 116a stores a portion of the sensitive data. In some of these embodiments, as each byte is read from the pblock 116a, its location address is checked against the character location and nibble order derived from the next integer stored in the scramble table 111a.

When the location of the byte in the pblock 116a that is being read by the password authentication module 150 matches with the location information derived from the next integer of sensitive data stored in the pblock 116a, the data stored in that derived location (character location and nibble order) in the pblock 116a is compared against the next portion of the input string. If they do not match, a negative state can be stored in an inputted state variable. However, instead of stopping at this time, the password authentication module 150 is programmed to continue reading the pblock 116a byte-by-byte until the end of the pblock 116a. If they match, the password authentication module 150 is programmed to continue reading the pblock 116a byte by byte until it reaches the next location derived from the next integer in the scramble table 111a, and again compare the data stored at that next location in the pblock 116a against the next portion of the input string. When all portions of the input string has been compared against with the data stored in the pblock 116a and they all match, the password authentication module 150 is programmed to store a positive state in the inputted state variable. When the password authentication module 150 validate the information related to the sensitive data (e.g., inputted string) entered by the user, the security controller manager module 135 is programmed to provide the user access to the target service.

In some embodiments, the security controller module 105 further includes a password extraction module 155 communicatively coupled with security controller manager module 135. In these embodiments, when the information entered by the user is authenticated, the password extraction module 155 is programmed to extract the sensitive data from the pblock 116a and place in a temporary location (e.g., a buffer, etc.). In some of these embodiments, the extraction requires the password extraction module 155 to re-compile the sensitive data from the different portions extracted from the pblock 116a. Optionally, if the sensitive data is encrypted, the encryption/decryption module 130 can decrypt the sensitive data before it is presented to the user or exported to the computing device 102 via the external interface 120.

The act of authentication or extraction represents an access to the sensitive data. In a preferred embodiment, the security controller module 105 further includes a morphing module 140 that is communicatively coupled with the security controller manager module 135. After the security controller manager module 135 provides an access to the pblock 116a (e.g., by authenticating the input strings or extracting the sensitive data from the pblock 116a, etc.), the morphing module 140 is programmed to morph the pblock 116a by storing the portions of sensitive data in different locations in the pblock 116a.

As mentioned above, the security controller module 105 is programmed to either generate multiple scramble tables in advance and store them in the scramble table database 110, or alternatively generate a new scramble table when the pblock is ready to be morphed. Thus, at this stage, the morphing module 140 is programmed to either retrieve a different scramble table (e.g., 111b) from the scramble table database or automatically create a new scramble table (e.g., 111b). Then, the security controller manager module 135 is programmed morph the pblock 116a by storing the sensitive data within the pblock 116a according to the new data storage scheme of the new scramble table 111b.

Preferably, the locations indicated by the new scramble table 111b do not overlap with the locations indicated by the scramble table 111a. However, in some embodiments, it is contemplated that it is acceptable to have less than 50% of, preferably less than 30%, more preferably less than 20% of the new pblock locations are overlapped with the pblock locations according to the previous scramble table.

Figure 2:
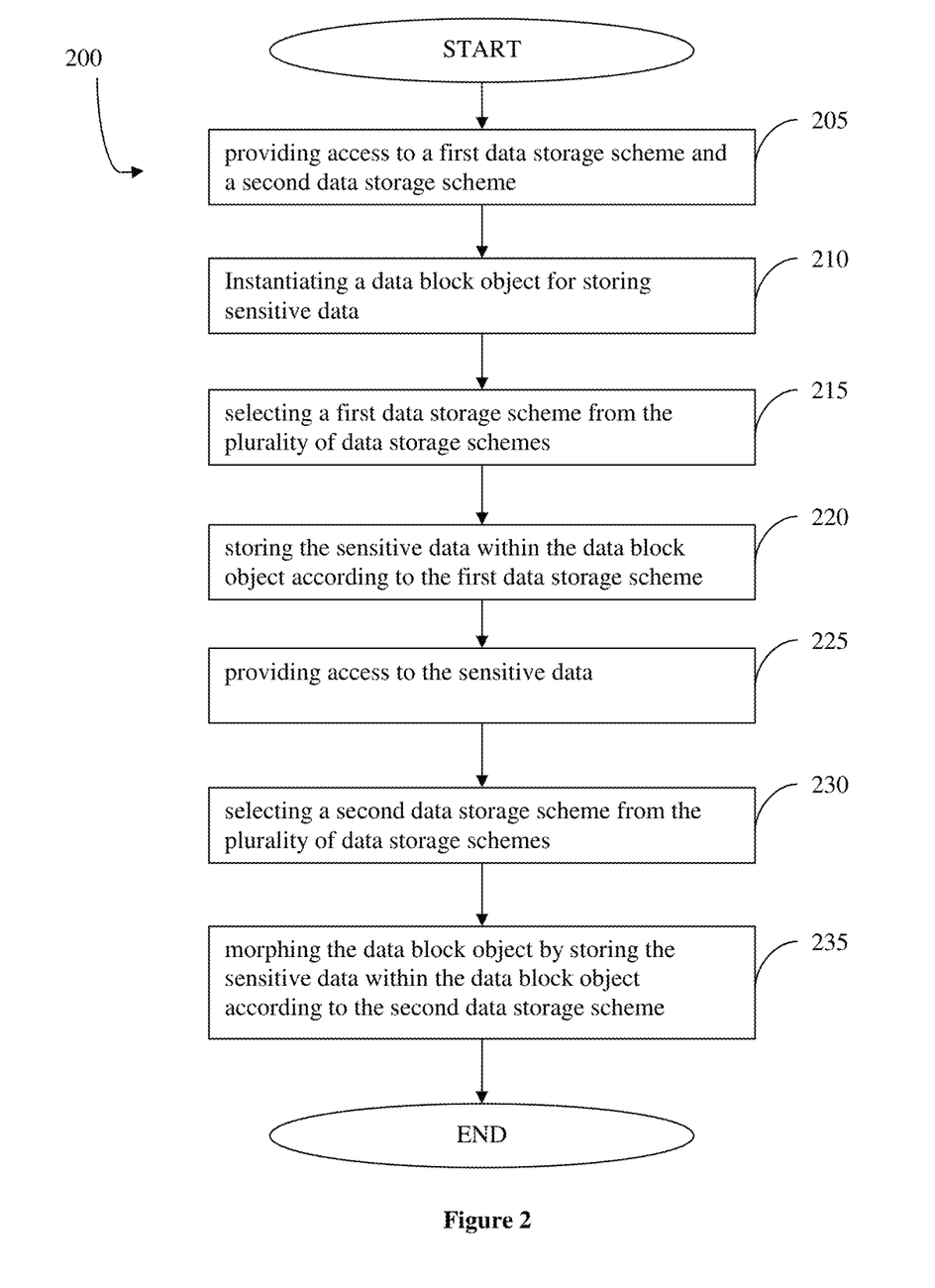
FIG. 2 shows a flowchart describing one embodiment of a method of securing sensitive data in a data object by using a scramble table and data storage schemes.

Another aspect of the present inventive subject matter provides computer-implemented methods that enable a user to securely store sensitive data (e.g., passwords, passcodes, secret texts, etc.) in a data object and protect the sensitive data from an unauthorized access or repeated accesses. FIG. 2 illustrates a flowchart of one embodiment of the methods. In a preferred embodiment, the method begins with a step 205 of providing an access to a plurality of data storage scheme, which is preferably stored in the scramble table. Then, the method continues by a step 210 of instantiating a data block object (e.g., pblock), by a processor, for storing the sensitive data. In this step 210, the method of instantiating the data block object comprises storing a data scheme identifier that uniquely identifies the data storage scheme in the data block object. In the next step 215, the processor selects one data storage scheme from the plurality of data storage scheme. Then, the method continues by a step 220 of storing the sensitive data within the pblock according to the data storage scheme selected in the step 215. In this step 220, the method of storing the sensitive data within the pblock includes a step of dividing the sensitive data into a plurality of portions and storing the plurality of portions in the data block object at the byte addresses denoted by the plurality of random numbers of the first storage scheme.

In some embodiments, the method continues by a step of 225 that the processor provides an access to the user or other computing device to the sensitive data in the pblock. In some embodiments, the access is provided by authenticating an input string against the sensitive data stored in the data block object based on the first data storage scheme. In these embodiments, the input string can be authenticated against the sensitive data by the processor, which is programmed to divide the input string into a plurality of portions and read data from the data block object byte by byte sequentially. The processor, then compare the data at the different byte addresses denoted by the data storage scheme within the data block object against the plurality of portions. Once the last portion in the plurality of portions is compared, the processor can continuously reads the remaining data in the data block object sequentially.

Once the access to the sensitive data is provided, the method continues by a step 230 of automatically selecting another data storage scheme from the plurality of data storage schemes or creating a new data storage scheme. Then the method continues by a step 235 of morphing the pblock by storing the sensitive data within the data block object according to the automatically selected or newly created data storage scheme. Preferably, in this step 235, the method of morphing includes a step of replacing the previous data scheme identifier with a new data scheme identifier that uniquely identifies the new data storage scheme in the data block.

EXAMPLE I

Figure 3:
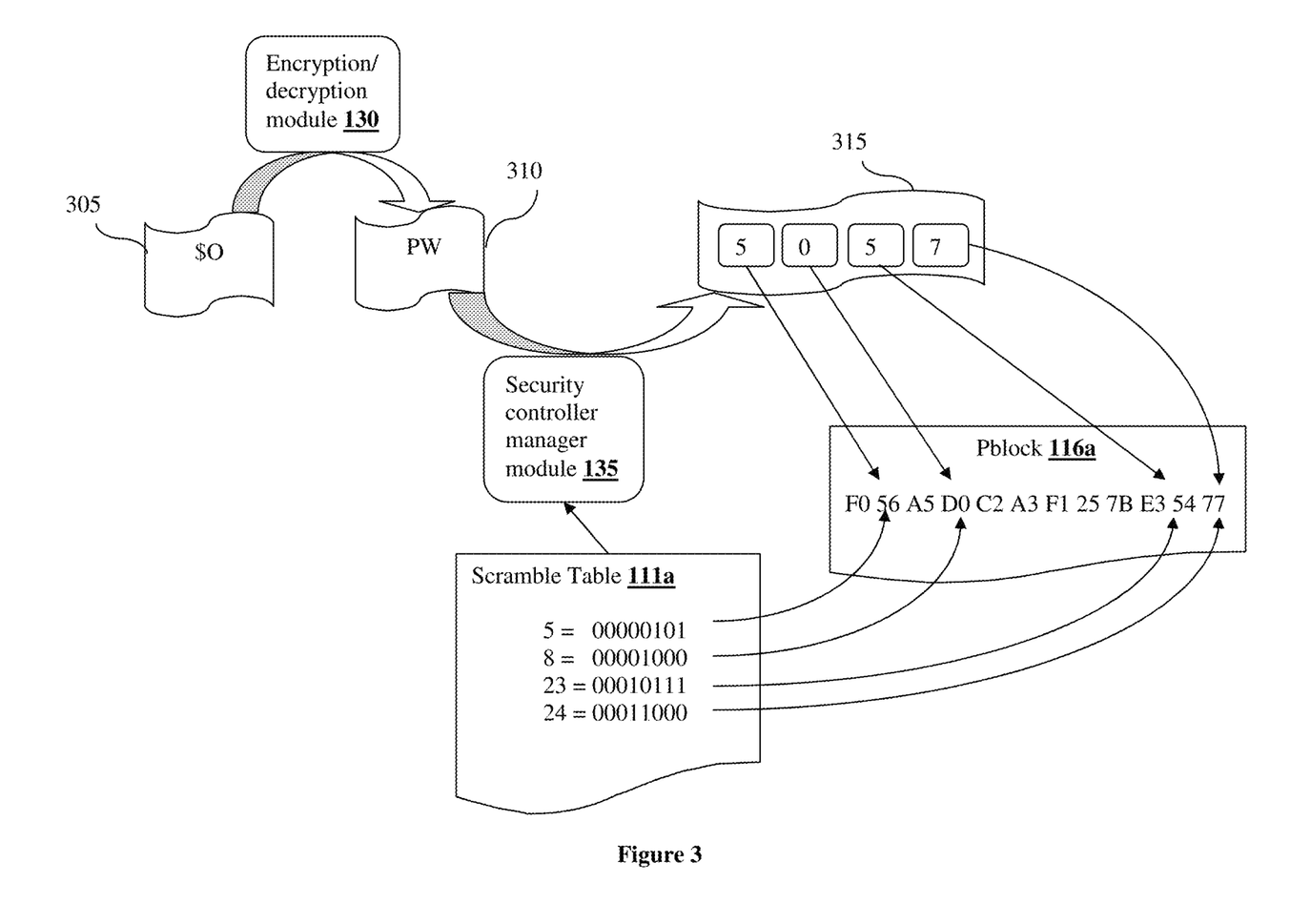
FIG. 3 shows an exemplary schematic of storing sensitive data in a data object using a scramble table and data storage schemes.

FIG. 3 illustrates one use example of storing sensitive data in the pblock 116*a* using the scramble table 111*a*. In this example, the sensitive data 305 comprises two characters "$O", which is encrypted to an encrypted sensitive data 310 represented as "PW" by the encryption/decryption module 130 in the security controller module 130. The encrypted data "PW" is converted into a hexadecimal representation of the encrypted data by the security controller manager module 135. For example, the letter "P" is converted into HEX representation "50". Likewise, the letter "W" is converted into HEX representation "57". Thus, the encrypted sensitive data 310 "PW" is converted into HEX representation 315, as "5057".

Optionally, the hexadecimal representation 315 of "5057" can be further converted into a binary representation, "0101 0000 0101 0111". In this example, the security controller module 105 is programmed to divide the sensitive data 310 "PW" into 4-bit sized (half an 8 bit byte) portions. Thus, the sensitive data 310 is divided into four different portions, if represented in hexadecimal representations—"5," "0," "5," and "7."

In this example, the security controller manager module 135 selects a scramble table 111*a*, which includes random numbers of '5', '8', '23', and '24', in an ascending order. Each of the random numbers denotes a character location in the pblock and a nibble order in the character location.

FIG. 3 also illustrates the pblock 116*a* generated by the security controller module 105. As shown, the pblock 116 comprises portions of the sensitive data among other randomly generated data that is in place to obfuscate the sensitive data. In this example, the pblock 116*a* has twelve blocks of character data, each block having a size of eight bits (a byte). Each block also has two equal sized nibbles (4 bits each). The first block of character data is "F0," where "F" is located a higher nibble and "0" is located in a lower nibble.

To derive the location information from an integer in the scramble table 111*a*, the security controller module 105 is programmed to first convert the integer to a binary representation. For example, the integer "5" is converted into "00000101". The integer "8" is converted into "00001000". The integer "23" is converted into "00010111". Finally, the integer "24" is converted into "00011000".

Once the integers are converted into a binary format, the security controller module 105 is programmed to extract the last significant bit, which represents the nibble order (1 being a high order and 0 being a low order). The security controller module 105 is then programmed to use the remaining (highest 7 digits) to construct a character location address in the pblock. For the first integer "5" in the scramble table 111*a*, the least significant bit is "1" which corresponds to a high nibble order. The remaining 7 digits "0000010," which corresponds to a decimal number "2," is the character location address in the pblock. In another example, the location denoted by the decimal number "8" in the scramble table 111*a* is designated by "0000100", which is corresponding to a decimal number "4". Likewise, the location denoted by the decimal number "23" in the scramble table 111*a* is designated by "0001011", which is corresponding to a decimal number "11", and the location denoted by the decimal number "24" in the scramble table 111*a* is designated by "0001100", which is corresponding to a decimal number "12".

The last digit of each binary code of the random decimal number indicates whether it designates either a higher nibble or a lower nibble. For example, if the last digit is "1", it designates that the data located by this random number goes to the higher nibble. If the last digit is "0", it designates that the data located by this random number goes to the lower nibble.

Thus, the first location and nibble denoted by the random number "5" of the scramble table 111*a* is location 2, higher nibble. The second location and nibble denoted by the random number "8" of the scramble table 111*a* is location 4, lower nibble. The third location and nibble denoted by the random number "23" of the scramble table 111*a* is location 11, higher nibble. The fourth location and nibble denoted by the random number "24" of the scramble table 111*a* is location 12, lower nibble.

Once the locations and the nibble orders are derived, the decimal characters of the encoded sensitive information are placed sequentially in the location and nibble. For example, the first decimal character "5" of the encoded sensitive information "PW" is placed in the location and nibble denoted by the first random number "5", which is the location 2 and higher nibble in the pblock 116*a*. For another example, the second decimal character "0" of the encoded sensitive information "PW" is located in the location and nibble denoted by the second random number "8", which is the location 4 and lower nibble in the pblock 116*a*. All other bytes are filled with random characters and numbers.

EXAMPLE II

While the encoded sensitive data "PW" can be stored in the pblock 116*a* as a 2 bit word, the size of the word and the size of the nibble in the pblock 116*a* can vary. For example, the encoded sensitive data "PW" can be stored in the pblock in a 2 bit nibble and a 4 bit word size.

In this example, each alphabet character is converted into two-digit decimal character, and each digit of the two digit decimal character is converted into 8 digit binary code. Instead of storing four digit numbers of the binary code in each location as shown in Example I, in this example, two digit numbers of the binary code are stored in each location. Because 4 locations in the pblock is required to store each alphabet character, total 8 random numbers or more are necessary to denote locations for the encoded sensitive data "PW"

In this example, the security controller manager module 135 selects a scramble table, which includes a random numbers of 3, 6, 8, 11, 15, 17, 20, and 23 in an ascending order. As explained above, each random number in the scramble table can be converted into 8-digit binary code, within which first 7 digits denote a location and the last digit denotes a nibble. For example:

3=00000011: location 1, high order nibble
6=00000110: location 3, low order nibble
8=00001000: location 4, low order nibble 11=00001011: location 5, high order nibble
15=00001111: location 7, high order nibble
17=00010001: location 8, high order nibble
20=00010100: location 10, low order nibble
23=00010111: location 11, high order nibble When the character "P" is converted into hexadecimal code 50, which corresponds to binary code "01010000", and the character "W" is converted into hexadecimal code 57, which corresponds to binary code "01010111", locating of "P" and "W" in the pblock is as follows:
P=hex 50=01 01 00 00
W=hex 57=01 01 01 11

Encoding the "P"

Location 1=01+RR (R=random bits=00)=0100=4 hexadecimal
Location 3=RR+01 (R=random bits=10)=1001=9 hexadecimal
Location 4=RR+00 (R=random bits=11)=1100=12 hexadecimal
Location 5=00+RR (R=random bits=01)=0001=1 hexadecimal Encoding the "W"

Location 7=01 +RR (R=random bits=01)=0101=5 hexadecimal
Location 8=01+RR (R=random bits=10)=0110=6 hexadecimal
Location 10=RR+01 (R=random bits=00)=0001=1 hexadecimal
Location 11=11+RR (R=random bits=11)=1111=F hexadecimal Thus, the location of encoded sensitive data "PW" denoted by the scramble table is as follows:
40 9C 1A 56 C1 F3 F1 25 7B E3 54 77

EXAMPLE III

Figure 4:
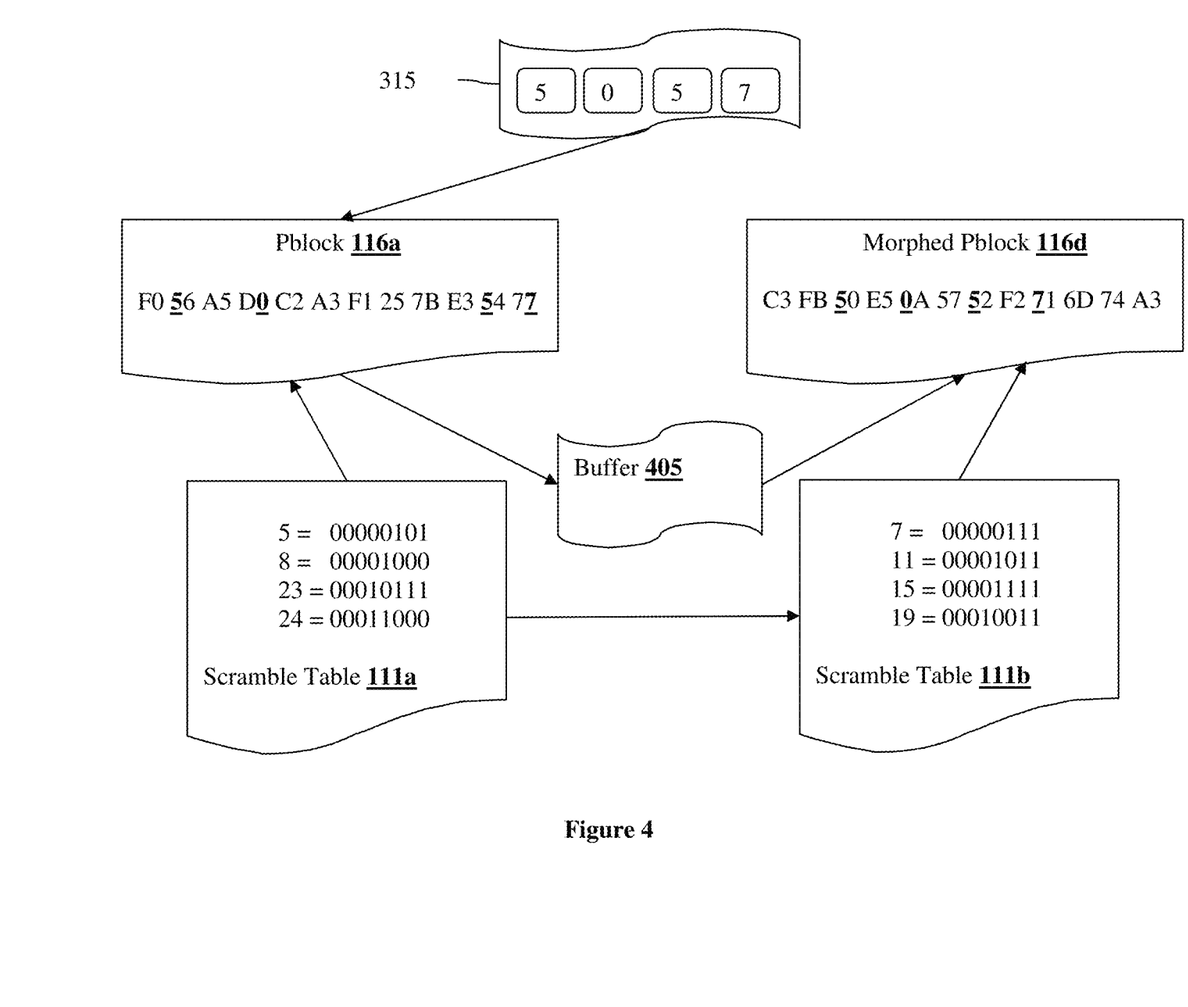
FIG. 4 shows an exemplary schematic of morphing a data block object.

FIG. 4 illustrates an example of morphing the sensitive data in the pblock 116a after the security controller module 105 provides an access to the sensitive data or pblock. Before the security controller module 105 provides an access to the sensitive data or pblock, the sensitive data is located in the pblock 116 in location 2, 4, 11, and 12 in high, low, high, and low nibbles respectively according to the data storage scheme of the scramble table 111a. After the security controller module 105 provides an access to the sensitive data or pblock, the morphing module select another scramble table 111b that was not used previously. In this example, the newly selected scramble table 111b includes random numbers 7, 11, 15, and 19, which are not overlapping with the previous scramble table 111a. The new random numbers 7, 11, 15, and 19 denotes new locations of the sensitive data in the morphed pblock 116d. Then, the sensitive data and other random characters and numbers that fill the rest of the pblock 116a moves to temporary buffer 405 and rearranged according to the new data storage scheme of the scramble table 111b in a morphed pblock 116b. Although FIG. 4 depicts pblock 116a and morphed pblock 116d as distinct pblocks that are separately stored in the pblock database 115, it should be appreciated that pblock 116a and morphed pblock 116d can alternatively be the same pblock with different data arrangements.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A system for securing sensitive data, comprising:
a database storing a first data storage scheme and a second data storage scheme,
wherein each of the first and second data storage schemes denotes at least one location for storing at least a portion of the sensitive data within a data block object, and
wherein each data storage scheme comprises a plurality of random numbers, each of which corresponds to one of the at least one location for storing the sensitive data within the data block object;
a security controller module comprising one or more processors and software instructions that when executed by the one or more processors, program the processor to perform the following steps:
instantiating a data block object for storing the sensitive data,
wherein a first byte and a last byte of the data block object are assigned unique identifiers; and
wherein the plurality of byte addresses denoted by the first data storage scheme and the plurality of byte addresses denoted by the second data storage scheme are non-overlapping;
storing the sensitive data within the data block object according to the first data storage scheme, wherein the security controller module is programmed to store the sensitive data within the data block object according to the first data storage scheme by:
dividing the sensitive data into a plurality of chunks; and
respectively storing the plurality of chunks in the data block object at the byte addresses denoted by a plurality of random numbers of the first storage scheme, wherein the plurality of random numbers is at least twice the maximum size of the sensitive data and additionally includes a size of a delimiter;
providing access to the data block object;
generating a new scramble table; and
automatically morphing the data block object by storing the sensitive data within the data block object according to the second data storage scheme, wherein the automatic morphing of the data block object is executed according to program instructions stored in the new scramble table; and
a password extraction module configured to execute, by the one or more processors, the following steps:
transfer the sensitive data into a buffer;
recompile the sensitive data;
extract the password from the sensitive data; and
determine whether the recompiled sensitive data is encrypted.

2. The system of claim 1, wherein each random number in the plurality of random numbers denotes a byte address within the data block object, which is used to store at least a portion of the sensitive data.

3. The system of claim 2, wherein each random number in the plurality of random numbers also denotes one of a high order and a low order within the byte address.

4. The system of claim 1, wherein the data block object comprises a data storage scheme identifier that identifies one of the first and the second data storage schemes.

5. The system of claim 1, wherein the security controller module is programmed to store the sensitive data by encrypting the sensitive data and storing the encrypted sensitive data in the data block object.

6. The system of claim 1, wherein the security controller module is programmed to provide access to the data block object by authenticating an input string against the sensitive data stored in the data block object based on the first data storage scheme.

7. The system of claim 6, wherein the security controller module is further programmed to authenticate an input string against the sensitive data stored in the data block object by:
dividing the input string into a plurality of chunks;
reading data from the data block object byte by byte sequentially;
comparing data at the different byte addresses denoted by the first data storage scheme within the data block object against the plurality of chunks; and
after comparing against the last chunk in the plurality of chunks, continuously reading the remaining data in the data block object sequentially.

8. The system of claim 1, wherein the security controller module is programmed to provide access to the sensitive data by extracting the sensitive data from the data block object according to the first data storage scheme and storing the extracted sensitive data in a buffer.

9. The system of claim 8, wherein the security controller module is programmed to extract the sensitive data by decrypting the extracted sensitive data.

10. A computer-implemented method of securing sensitive data, comprising:
providing access to a first data storage scheme and a second data storage scheme,
wherein each of the first and second data storage schemes denotes at least one location for storing at least a portion of the sensitive data within a data block object;
instantiating, by one or more processors, a data block object for storing the sensitive data,
wherein a first byte and a last byte of the data block object are assigned unique identifiers; and
wherein a plurality of byte addresses denoted by the first data storage scheme and a plurality of byte addresses denoted by the second data storage scheme are non-overlapping;
storing, by the one or more processors, the sensitive data within the data block object according to the first data storage scheme, wherein storing the sensitive data within the data block object according to the first data storage scheme comprises:
dividing the sensitive data into a plurality of chunks; and
respectively storing the plurality of chunks in the data block object at the byte addresses denoted by the plurality of random numbers of the first storage scheme, wherein the plurality of random numbers is at least twice the maximum size of the sensitive data and additionally includes a size of a delimiter;
providing, by the one or more processors, access to the data block object;
generating, by the one or more processors, a new scramble table; and
after providing access to the data block object, automatically morphing, by the one or more processors, the data block object by storing the sensitive data within the data block object according to the second data storage scheme, wherein the automatic morphing of the data block object is executed according to program instructions stored in the new scramble table;
transferring, by the one or more processors, the sensitive data into a buffer;
recompiling, by the one or more processors, the sensitive data;
extracting, by the one or more processors, the password from the sensitive data; and
determining, by the one or more processors, whether the recompiled sensitive data is encrypted.

11. The method of claim 10, wherein each data storage scheme comprises a plurality of random numbers, each of which corresponds to one of the at least one location for storing the sensitive data within the data block object.

12. The method of claim 11, wherein each random number in the plurality of random numbers denote a byte address within the data block object for storing at least a portion of the sensitive data.

13. The method of claim 12, wherein each random number in the plurality of random numbers also denote one of a high order and a low order within the byte address.

14. The method of claim 10, wherein providing access to the data block object comprises authenticating an input string against the sensitive data stored in the data block object based on the first data storage scheme.

15. The method of claim 14, wherein authenticating an input string against the sensitive data stored in the data block object comprises:
dividing the input string into a plurality of chunks;
reading data from the data block object byte by byte sequentially;
comparing data at the different byte addresses denoted by the first data storage scheme within the data block object against the plurality of chunks; and
after comparing against the last chunk in the plurality of chunks, continuously reading the remaining data in the data block object sequentially.

16. The method of claim 10, wherein instantiating the data block object comprises storing a first data scheme identifier that uniquely identifies the first data storage scheme in the data block object.

17. The method of claim 10, wherein morphing the data block object comprises replacing the first data scheme identifier with a second data scheme identifier that uniquely identifies the second data storage scheme in the data block.

18. The system of claim 1, wherein the password extraction module is further configured to:
in response to determining that the recompiled sensitive data is encrypted, decrypt the recompiled sensitive data; and
send the decrypted recompiled sensitive data to a computing device via an external interface.

19. The method of claim 10, wherein the password extraction module is further configured to:

in response to determining that the recompiled sensitive data is encrypted, decrypt the recompiled sensitive data; and send the decrypted recompiled sensitive data to a computing device via an external interface.

* * * * *